(12) United States Patent
Livschitz et al.

(10) Patent No.: US 10,536,322 B2
(45) Date of Patent: Jan. 14, 2020

(54) RESOURCE MANAGEMENT FOR SERVICES

(71) Applicant: Microsoft Technology Licensing, LLC, Redmond, WA (US)

(72) Inventors: Mark Livschitz, Seattle, WA (US); Arsalan Ahmad, Redmond, WA (US); Alain Franck Gefflaut, Kirkland, WA (US); Gregory J. Colombo, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

(21) Appl. No.: 15/639,042

(22) Filed: Jun. 30, 2017

(65) Prior Publication Data

US 2018/0205593 A1 Jul. 19, 2018

Related U.S. Application Data

(60) Provisional application No. 62/447,170, filed on Jan. 17, 2017.

(51) Int. Cl.
*H04L 12/24* (2006.01)
*H04L 29/08* (2006.01)

(52) U.S. Cl.
CPC .......... *H04L 41/00* (2013.01); *H04L 41/0213* (2013.01); *H04L 67/1002* (2013.01); *H04L 67/1008* (2013.01); *H04L 67/1029* (2013.01)

(58) Field of Classification Search
CPC ............. H04L 67/1002; H04L 41/0213; H04L 67/1029
USPC ........ 709/217, 223, 224, 226, 227; 717/124, 717/127, 129, 130
See application file for complete search history.

(56) References Cited

U.S. PATENT DOCUMENTS

| 9,032,413 | B2 | 5/2015 | Schwartz et al. |
|---|---|---|---|
| 9,060,196 | B2 | 6/2015 | Torr et al. |
| 9,081,623 | B1 | 7/2015 | Magerramov et al. |
| 9,164,803 | B2 | 10/2015 | Kishan et al. |

(Continued)

OTHER PUBLICATIONS

"Resource Allocation in Uplink Long Term Evolution"—Reyhanimasoleh et al, Department of Electrical and Computer Engineering, University of Western Ontario, Sep. 2013 (Year: 2013).*

(Continued)

*Primary Examiner* — Randy A Scott
(74) *Attorney, Agent, or Firm* — Liang IP, PLLC (57) ABSTRACT

A service control manager manages one or more services on a computing device, such as creating processes that host the services, stopping the processes that host the services, and so forth. The service control manager also provides a request to a resource manager to reserve, monitor, and/or place limitations on resources for each of the one or more services. For example, the service control manager can request to be notified when resource usage by a service exceeds a resource usage threshold value. These resources are various resources of the computing device, such as a processor (CPU), memory, storage device input/output (I/O), network usage, and so forth. If the usage of a resource by a service satisfies the resource usage threshold value for that resource for that service, then the resource manager notifies the service control manager so the service control manager can take an appropriate remedial action.

20 Claims, 5 Drawing Sheets

(56) References Cited

U.S. PATENT DOCUMENTS

| | | | | |
|---|---|---|---|---|
| 9,258,231 | B2* | 2/2016 | Dheap | H04L 47/10 |
| 2002/0066021 | A1* | 5/2002 | Chien | G06F 21/125 |
| | | | | 726/3 |
| 2012/0192186 | A1 | 7/2012 | Bornstein et al. | |
| 2014/0075439 | A1* | 3/2014 | Wang | G06F 9/45558 |
| | | | | 718/1 |
| 2014/0123151 | A1 | 5/2014 | Kishan et al. | |
| 2015/0033134 | A1* | 1/2015 | Bragstad | H04L 67/36 |
| | | | | 715/736 |
| 2015/0149632 | A1 | 5/2015 | Chin et al. | |
| 2015/0347181 | A1* | 12/2015 | Myrick | G06F 9/44594 |
| | | | | 718/102 |
| 2015/0347262 | A1* | 12/2015 | Vyas | G06F 11/3409 |
| | | | | 718/104 |
| 2015/0350021 | A1* | 12/2015 | Morris | H04L 41/0816 |
| | | | | 709/224 |

OTHER PUBLICATIONS

"Use Activity Monitor on your Mac", https://support.apple.com/en-gb/HT201464, Published on: Dec. 15, 2016, 7 pages.

"Support your app with background tasks", https://msdn.microsoft.com/en-us/windows/uwp/launch-resume/support-your-app-with-background-tasks, Published on: Jan. 25, 2017, 5 pages.

"Service Control Manager", https://msdn.microsoft.com/en-us/library/windows/desktop/ms685150(v=vs.85).aspx, Published on: Oct. 2, 2011, 1 pages.

Martins, et al., "Selectively Taming Background Android Apps to Improve Battery Lifetime", In Proceedings of the USENIX Annual Technical Conference, Jul. 8, 2015, pp. 563-575.

* cited by examiner

RESOURCE MANAGEMENT FOR SERVICES

RELATED APPLICATIONS

This application claims priority to U.S. Provisional Application No. 62/447,170, filed Jan. 17, 2017, entitled "Resource Management for Services", the disclosure of which is hereby incorporated by reference herein in its entirety.

BACKGROUND

Services typically run on a computing device in the background, providing various functionality to the computing device. These services have access to and use various different resources in the computing device. While these services provide functionality that is beneficial to users, they are not without their problems. One such problem is that the use of resources by the services can conflict with the user's requested use of the device, which can lead to a poor user experience and user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a resource manager receives from a service control manager an identification of a service running on a computing device. The resource manager also receives from the service control manager an identification of a resource usage threshold value for the service. Usage, by the service, of a resource on the computing device is monitored. The service satisfying the resource usage threshold value is detected, and the resource manager notifies the service control manager to take an appropriate remedial action in response to the service satisfying the resource usage threshold.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Resource management for services is discussed herein. A service control manager manages one or more services on a computing device, such as creating processes that host the services, stopping the processes that host the services, and so forth. The service control manager also provides a request to a resource manager to reserve, monitor, and/or place limitations on resources for each of the one or more services. For example, the service control manager can request to be notified of when resource usage by a service exceeds a resource usage threshold value. These resources are various resources of the computing device, such as a processor (CPU), memory, storage device input/output (I/O), network usage, and so forth.

The resource manager receives the requests to reserve, monitor, and/or place limitations on resources for each of the one or more services, and responds to these requests appropriately. In response to a request to reserve resources for a service, the resource manager reserves the requested resources for the service, allowing the service to know that the resources it desires will be available to it. In response to a request to place limitations on resources for a service, the resource manager communicates with an operating system component to impose the requested limitations. For a request to monitor resources for a service, the service control manager provides one or more resource usage threshold values to the resource manager. The resource manager monitors the usage of the resources by the service, and if a resource usage threshold value is satisfied by a service the resource manager notifies the service control manager that the resource usage threshold value has been satisfied. The service control manager can then take various remedial actions in response to being notified that a resource usage threshold value has been satisfied for a service, such as terminating the service, communicating a request to the service for the service to reduce its resource usage, communicate with an operating system component to reduce resources available and/or allocated to the service, and so forth.

By monitoring resource usage by a service and taking remedial action when a resource usage threshold is satisfied, the techniques discussed herein allow services to be constrained and prevented from overburdening resources in the computing device. Services that may otherwise run unbounded and consume a large percentage of the resources in the computing device are instead constrained, allowing more resource usage for user-requested operations and/or applications. Additionally, by constraining resource usage by the services, the amount of resources used by the services can be reduced and power consumption in the computing device reduced.

Figure 1:
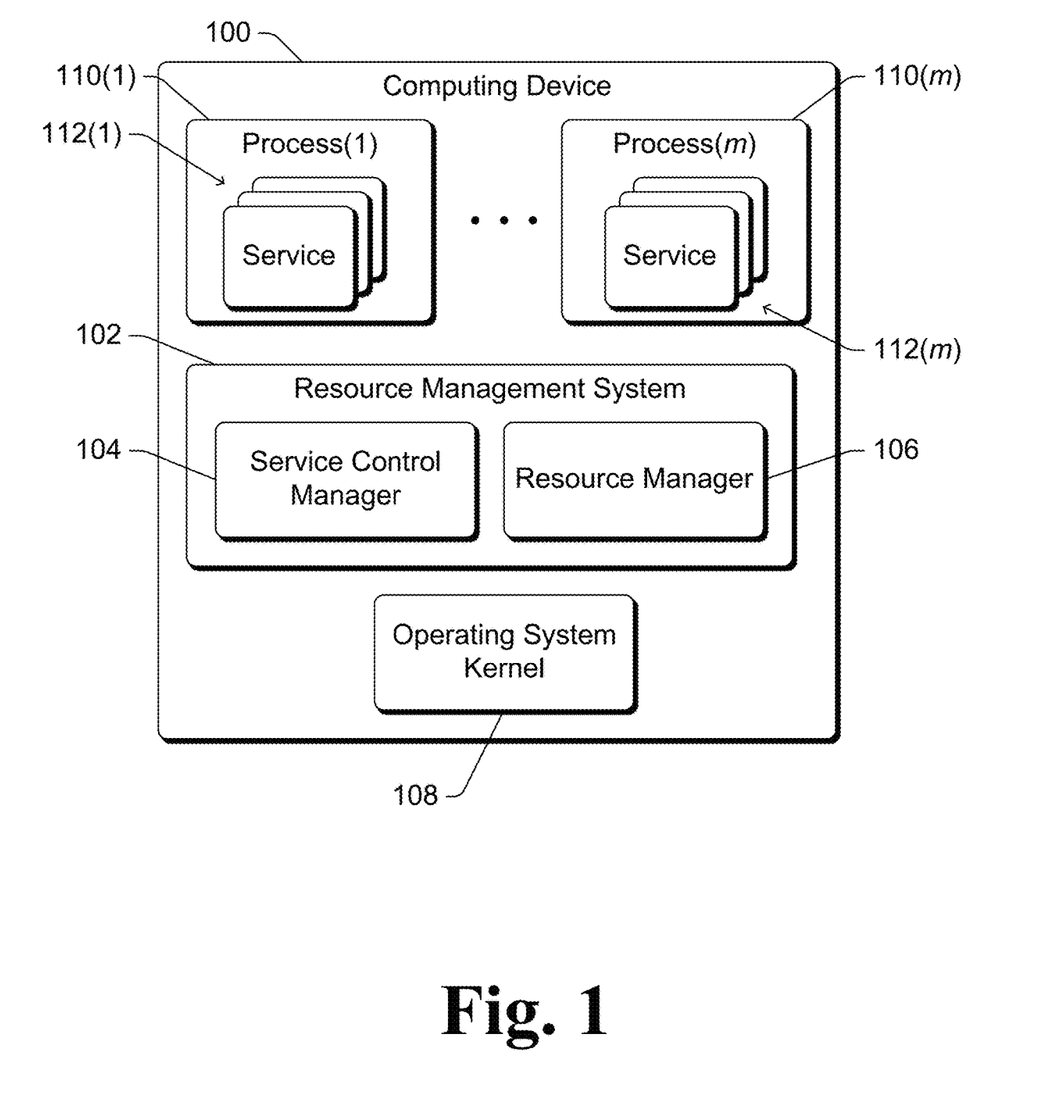
FIG. 1 is a block diagram illustrating an example computing device implementing the resource management for services in accordance with one or more embodiments.

FIG. 1 is a block diagram illustrating an example computing device 100 implementing the resource management for services in accordance with one or more embodiments. Computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, an augmented reality (AR) headset, a virtual reality (VR) headset), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, a virtual device running on the cloud, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles) or virtual devices that share resources of a physical device (e.g. virtual machines in the cloud).

The computing device 100 includes a resource management system 102 that includes a service control manager 104 and a resource manager 106. The computing device 100 also includes an operating system kernel 108. Although illustrated as separate from the resource management system 102, at least part of the operating system 108 can optionally be included as part of the resource management system 102.

One or more (m) processes 110(1), . . . , 110(m) are run on the computing device, each hosting one or more services 112(1), . . . , 112(m). A process 110 hosting a service 112 refers to the process 100 running to execute or perform the functionality of the service. A process 110 can host a single service 112, a process 110 can host multiple services 112, or multiple processes 110 can operate to host a single service 112. Each service 112 is a software component that provides a functionality to other parts of the computing device 100 (e.g., the operating system) or directly to applications running on the computing device 100. A service typically does not provide any visible user interface (UI) and is expected to run in the background. Services may also be referred to as daemons. The services 112 can include in-box services, which are services that are provided by the vendor of the operating system running on the computing device 100. The services 112 can also include third party services that can be added to the computing device 100 by anybody, and oftentimes are installed on the computing device 100 when installing applications or driver packages on the computing device 100. Examples of services 112 include anti-malware programs, indexing programs (e.g., storage device indexing programs to improve search speeds), operating system or application update programs, and so forth.

The services 112 can each use various resources of the computing device 100. These resources include, for example, memory (e.g., random access memory (RAM)) of the computing device 100, one or more processors (e.g., CPUs) of the computing device 100, storage device (e.g., disk) I/O, network I/O, and so forth. In contrast to systems that impose no limits or restrictions on resource usage by services, the techniques discussed herein can constrain resource usage by the services 100, allowing resources to remain available for user-requested applications or operations.

The service control manager 104 manages the services 112 in the computing device 100. This management can include creating the processes that host the services 112, terminating processes that host the services 112 at the appropriate times, handling feedback regarding resource usage thresholds that have been satisfied by a service as discussed in more detail below, and so forth. The service control manager 104 can determine which services are allowed to run on the computing device 100 in various manners, such as by allowing any service installed on the computing device 100 to run, employing various access controls or permissions to determine which services can run on the computing device 100, accessing a policy (e.g., provided by an administrator or user of the computing device 100) or set of rules indicating which services can run on the computing device 100, and so forth.

The service control manager 104 also communicates with the resource manager 106 to reserve, monitor, and/or place limitations on resources in the computing device 100. The service control manager 104 can determine which resources to reserve, monitor, and/or place limitations on in various manners, such as based on requests from the services 112 (e.g., a service 112 requesting, when the service starts running, reservation of particular resources and/or particular amounts of particular resources), based on a policy or rules stored on the computing device 100 (or otherwise accessible to the service control manager 104, such as from a remote service or device), and so forth.

In one or more embodiments, the service control manager 104 communicates with the resource manager 106 to reserve resources in the computing device 100 for a service 112. The service control manager 104 can communicate a request to reserve resources for a service 112 at various times, such as when the service 112 begins running. As part of the request to reserve resources, the service control manager 104 identifies the resources (and how much of the resources) to be reserved. In response to a request to reserve resources for a service 112, the resource manager 106 checks whether the requested resources are available. If the requested resources are available, then the resource manager 106 reserves the resources for the service 112, allowing the service 112 to know that the requested resources will be available to the service 112 when the service 112 desires to use them. For example, the service control manager 104 may request that 5 megabytes of memory be reserved for a service 112. The resource manager 106 maintains a record of memory that has already been reserved (or is being used) by other services and/or programs in the computing device 100, and determines whether there is 5 megabytes of memory available that has not already been reserved (and/or is not already being used). If there is 5 megabytes of memory available, the resource manager 106 reserves the 5 megabytes for the service 112, maintaining a record of this reservation. If the service 112 is subsequently terminated, the service control manager 104 notifies the resource manager 106 of such termination and the resource manager 106 can release the reservation of the 5 megabytes.

If the resource manager 106 cannot satisfy the request for reservation of a resource (e.g., there is not 5 megabytes of memory available), the resource manager 106 notifies the service control manager 104 that the request cannot be satisfied. The service control manager 104 can respond to this notification in various manners, such as not running the service 112, running the service 112 but notifying the service 112 that the desired resources are not available to the service 112, and so forth.

In one or more embodiments, the service control manager 104 communicates with the resource manager 106 to place limitations on resources in the computing device 100 for a service 112. The service control manager 104 can communicate a request to place limitations on resources for a service 112 at various times, such as when the service 112 begins running. As part of the request to place limitations on resources, the service control manager 104 identifies the resources on which the limitations are to be placed as well as what the limitation is. In response to a request to place limitations on resources for a service 112, the resource manager 106 communicates with the operating system kernel 108 to impose the requested limitations. The operating system kernel 108 monitors requests or attempts to access the resources and ensures that those requests or attempts are not permitted if they exceed the requested limitations. For example, the service control manager 104 can request to place a limitation of a particular percentage (e.g., 2%) of a processor for a service 112. The operating system kernel 108 monitors the amount of time that the processor runs the process 110 that hosts the service 112 and does not schedule the process 110 that hosts the service 112 to run using more than 2% of the processor capacity.

In one or more embodiments, the service control manager 104 communicates with the resource manager 106 to monitor resources in the computing device 100 for a service 112. The service control manager 104 can communicate a request to monitor resources for a service 112 at various times, such as when the service 112 begins running. As part of the request to monitor resources, the service control manager 104 identifies the resources to be monitored and thresholds or values for each resource. In response to a request to monitor resources for a service 112, the resource manager 106 maintains a record of the resources to be monitored and the thresholds or values for each resource.

The resource manager 106 monitors the usage of the resources by the service 112, and can do so in various manners. For example, the resource manager 106 can communicate with the operating system kernel 108 and receive information from the operating system kernel 108 indicating how much of different resources are used by which services 112. E.g., the operating system kernel 108 can notify the resource manager 106 that a particular service 112 has been allocated a particular amount of memory (e.g., 5 megabytes of memory, 2% of the processor capacity), has used a particular amount of the disk I/O bandwidth (e.g., 10 megabytes per second, 25% of the disk I/O bandwidth), and so forth. Additionally or alternatively, the resource manager 106 can have the operating system kernel 108 monitor the resource usage by the services 112 and notify the resource manager 106 when a particular resource usage threshold value has been satisfied by a service 112.

In one or more embodiments, the resource manager 106 is able to monitor resource usage at the granularity of a process. A single process may host multiple services, a single process may host a single service, or multiple processes may host a single service. In situations in which a single process hosts a single service or multiple processes host a single service, the resource manager 106 can monitor the usage of resources by the single service.

However, in situations in which a single process hosts multiple services, the resource manager 106 monitors resource usage by that process. The resource manager 106 is not able to distinguish between resource usage of the different services hosted in that single process, and thus treats all services hosted in the single process the same. For example, the service control manager 104 can identify a particular service 112 to the resource manager 106 and provide an indication to the resource manager 106 of the entity hosting that particular service 112 (e.g., the process 110 hosting that particular service 112). The operating system kernel 108 can notify the resource manager 106 that a particular process hosting multiple services has used a particular amount of the disk I/O bandwidth (e.g., 10 megabytes per second, 25% of the disk I/O bandwidth), and the resource manager 106 sends notifications about the process 110 hosting that particular service 112 to the service control manager 104. By way of another example, the service control manager 104 can request to place a limitation of a particular percentage (e.g., 2%) of a processor for a particular service 112 that is hosted by a process 110 that also hosts multiple other services 112. The operating system kernel 108 monitors the amount of time that the processor runs the process 110 that hosts the particular service 112 and does not schedule the process 110 that hosts the particular service 112 to run using more than 2% of the processor capacity.

If a resource usage threshold value is satisfied by a service 112 (e.g., the service 112 uses an amount of the resource that is greater than (or equal to or greater than) the resource usage threshold value, then the resource usage threshold value is satisfied by the service 112), the resource manager 106 notifies the service control manager 104 that the resource usage threshold value for a particular service has been satisfied. The resource manager 106 can notify the service control manager 104 in various manners. In one or more embodiments, the service control manager 104 provides to the resource manager 106 one or more callbacks along with the request to monitor resources for the service 112. Each resource usage threshold value for the service 112 can have its own associated callback, which is called by the resource manager 106 when that resource usage threshold value is satisfied. Alternatively, multiple resource usage thresholds or values for the service 112 can share a callback, which is called by the resource manager 106 when one of those resource usage thresholds or values is satisfied and the resource manager 106 provides as a parameter for the callback an indication of which resource usage threshold value was satisfied.

In response to being notified that a resource usage threshold value has been satisfied, the service control manager 104 takes an appropriate remedial action. Various different remedial actions can be taken, and which remedial action is taken can be determined by the service control manager 104 applying various policies and/or rules. These policies and/or rules can be obtained from various sources, such as a designer of an operating system of the computing device 100, a user or administrator of the computing device 100, a remote device or service, and so forth.

In one or more embodiments, one remedial action that the service control manager 104 can take is to communicate a request to the service 112 for which the resource usage threshold value was satisfied to reduce its usage of the resource. The request can optionally include an indication of how much to reduce its usage of the resource. For example, the request can include an indication to reduce disk I/O bandwidth by a fixed amount (e.g., by 2 megabytes per second) or a relative amount (e.g., reduce disk I/O bandwidth by 10%). The service 112 itself also optionally determines how much to reduce its usage of the resource.

Additionally or alternatively, a remedial action that the service control manager 104 can take is to stop or terminate the service 112. For example, the service control manager 104 can communicate with the operating system kernel 108 to terminate execution of the process 110 that hosts the service 112. The stopping of the service 112 can optionally be temporary. For example, the service control manager 104 can communicate with the operating system kernel 108 to stop execution of the process 110 that hosts the service 112 until a particular event occurs (e.g., usage of a particular resource (such as the same resource that caused a threshold value to be satisfied and the remedial action taken) drops below a threshold value, a particular amount of time elapses (e.g., 1 minute or 10 minutes), etc.).

Additionally or alternatively, a remedial action that the service control manager 104 can take is to communicate with the operating system kernel 108 to place limitations on resources in the computing device 100 for the service 112. This placing of limitations on resources for the service 112 is analogous to the discussion above, although the request can be communicated to the operating system kernel 108 rather than the resource manager 106.

It should be noted that the service control manager 104 can provide to the resource manager 106 multiple different resource usage threshold values for the same resource. The service control manager 104 can associate different callbacks with the different resource usage threshold values for a service 112, and different remedial actions can be taken in response to the different resource usage threshold values being satisfied. For example, the service control manager 104 can identify a first callback if a first resource usage threshold value is satisfied (e.g., 5 megabytes of memory usage) for the service 112, and a second callback if a second resource usage threshold value is satisfied (e.g., 15 megabytes of memory usage) for the service 112. The resource manager 106 calls the first callback when the first resource usage threshold value is satisfied, and the service control manager 104 takes a first remedial action (e.g., communicates a request to the service to reduce its memory usage). The resource manager 106 calls the second callback when the second resource usage threshold value is satisfied, and the service control manager 104 takes a second remedial action (e.g., the service control manager 104 assumes its request to the service to reduce its memory usage is being ignored, so the service control manager 104 terminates execution of the process that hosts the service).

The different resource usage threshold values can also be for different resources. For example, the service control manager 104 can identify a first callback if a first resource usage threshold value for a first resource is satisfied (e.g., 5 megabytes of memory usage) for the service 112, and a second callback if a second resource usage threshold value for a second resource is satisfied (e.g., 10 megabytes per second of disk I/O bandwidth) for the service 112. The resource manager 106 calls the first callback when the first resource usage threshold value is satisfied, and the service control manager 104 takes a first remedial action (e.g., communicates a request to the service to reduce its memory usage). The resource manager 106 calls the second callback when the second resource usage threshold value is satisfied, and the service control manager 104 takes a second remedial action (e.g., the service control manager 104 communicates with the operating system kernel 108 to place limitations on the memory usage and/or disk I/O bandwidth usage in the computing device 100 for the service 112).

It should also be noted that various different combinatorial logic can also be used to combine resource usage thresholds. This combinatorial logic can include logical ANDs, logical ORs, exclusive-ORs, and so forth. For example, the resource manager 106 can notify the service control manager 104 that a resource usage threshold value for a particular service has been satisfied if a first resource usage threshold value for a first resource is satisfied (e.g., 5 megabytes of memory usage) and a second resource usage value for a second resource is satisfied (e.g., 5 megabytes per second of disk I/O bandwidth) for the service 112. By way of another example, an exclusive-OR operation can be used so that the resource manager 106 notifies the service control manager 104 that a resource usage threshold value for a particular service has been satisfied if either, but not both, a first resource usage threshold value for a first resource is satisfied (e.g., 10 megabytes of memory usage) or a second resource usage value for a second resource is satisfied (e.g., 10 megabytes per second of disk I/O bandwidth) for the service 112

Figure 2:
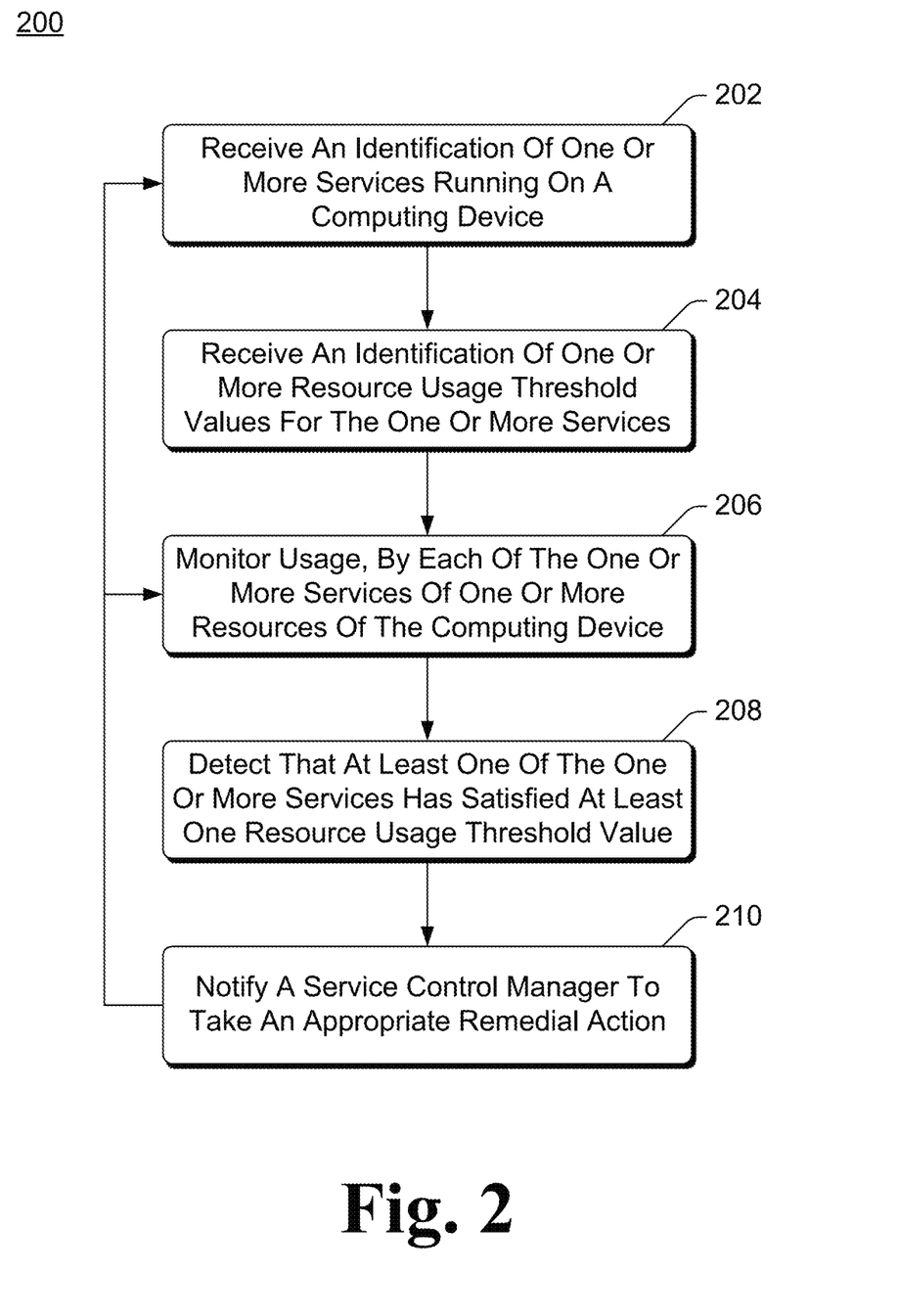
FIGS. 2, 3, and 4 are flowcharts illustrating example processes for implementing the resource management for services in accordance with one or more embodiments.

FIG. 2 is a flowchart illustrating an example process 200 for implementing the resource management for services in accordance with one or more embodiments. Process 200 is carried out by a resource management system, such as resource management system 102 of FIG. 1, and can be implemented in software, firmware, hardware, or combinations thereof. Process 200 is shown as a set of acts and is not limited to the order shown for performing the operations of the various acts. Process 200 is an example process for implementing the resource management for services; additional discussions of implementing the resource management for services are included herein with reference to different figures.

In process 200, an identification of one or more services running on a computing device is received (act 202). This identification is received, for example, by a resource manager from a service control manager.

An identification of one or more resource usage threshold values for the one or more services is also received (act 204). This identification of resource usage threshold values for a service can be received along with the identification that the service is running on the computing device.

Usage of one or more resources of the computing device by each of the one or more services is monitored (act 206). This monitoring is to determine whether usage of a resource by a service satisfies one or more resource usage threshold values for the resource for the service. Different services can have different resource usage threshold values, and resource usage threshold values for different resources.

Eventually, at least one resource usage threshold value being satisfied by at least one of the one or more services is detected (act 208). In one or more embodiments, the resource usage threshold value is satisfied by a service if the usage of the resource by the service is greater than (or equal to or greater than) the resource usage threshold value.

The service control manager is notified that the at least one resource usage threshold value has been satisfied by at least one of the one or more services (act 210). The notification can be made, for example, by calling a callback provided by the service control manager along with the resource usage threshold value. The service control manager can then take an appropriate remedial action, as discussed above.

It should be noted that process 200 can be performed repeatedly as new services begin running in the computing device and/or execution of services is terminated.

It should also be noted that monitoring usage of one or more resources of the computing device by each of the one or more services in act 206 can continue in an attempt to detect additional resource usage threshold values being satisfied in act 208 and additional remedial actions being taken in act 210.

Figure 3:
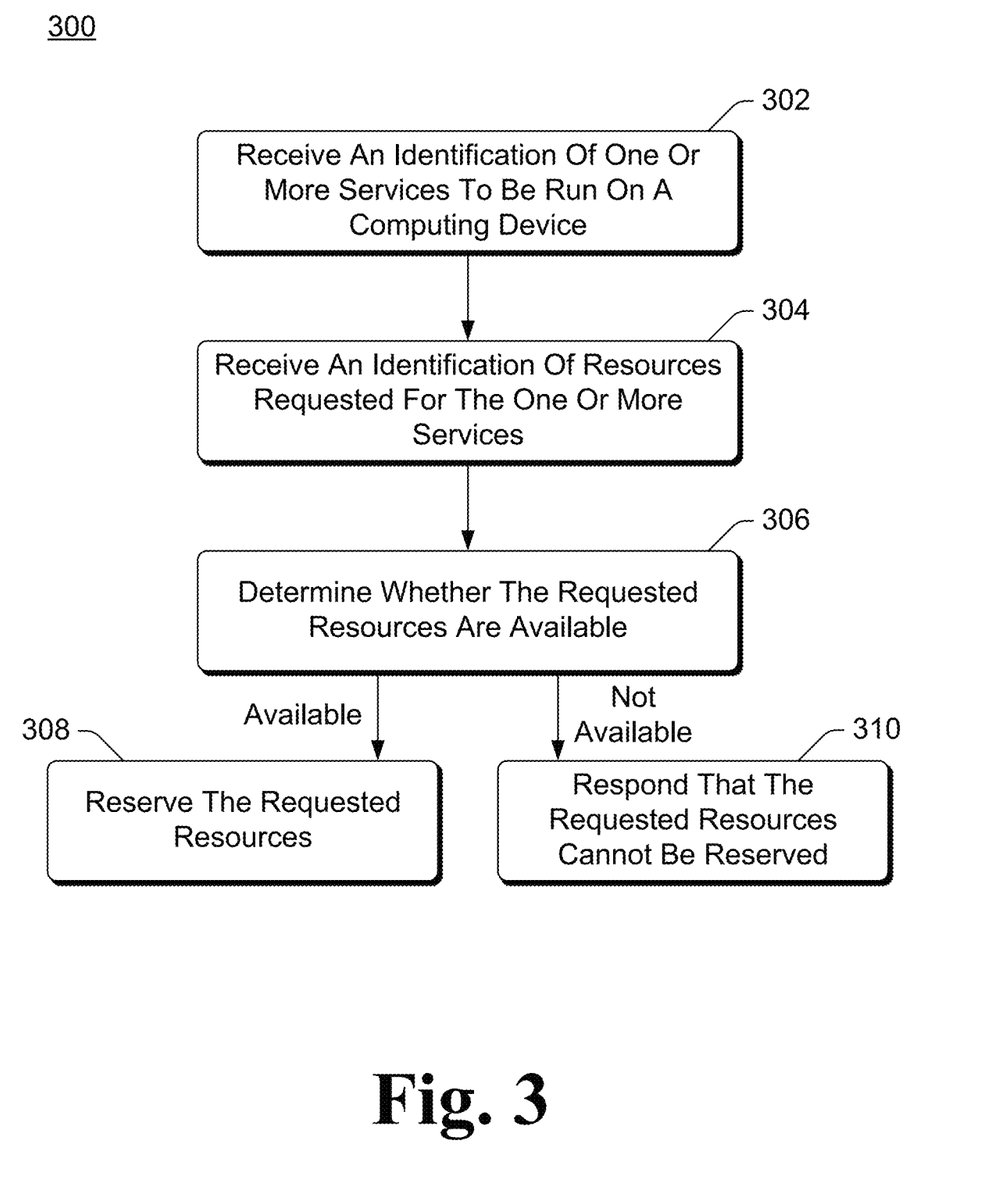

FIG. 3 is a flowchart illustrating another example process 300 for implementing the resource management for services in accordance with one or more embodiments. Process 300 is carried out by a resource management system, such as resource management system 102 of FIG. 1, and can be implemented in software, firmware, hardware, or combinations thereof. Process 300 is shown as a set of acts and is not limited to the order shown for performing the operations of the various acts. Process 300 is an example process for implementing the resource management for services; additional discussions of implementing the resource management for services are included herein with reference to different figures.

In process 300, an identification of one or more services to be run on a computing device is received (act 302). This identification is received, for example, by a resource manager from a service control manager. The one or more services can be already running, can be in the process of beginning running (e.g., requested to run but not yet executing), and so forth.

An identification of resources requested for the one or more services is also received (act 304). This identification can also include an amount of a resource that is requested (e.g., 10 megabytes per second of disk I/O bandwidth, 10 megabytes of memory). The requested resources can be determined in various manners, such as from the one or more services themselves, from various policies or rules, and so forth as discussed above.

A determination is made as to whether the requested resources are available (act 306). A record of resources that are in use and/or reserved is maintained, and the total amount of resources in the system is known (e.g., available from the operating system). Given this record and the total amount or resources, it can be readily determined whether the requested resources are available.

If the requested resources are available, then the requested resources are reserved (act 308). A record of these requested resources is maintained and used if a subsequent request for another service to reserve resources is received. An indication that the requested resources are available and reserved is also optionally returned (e.g., to the service control manager).

However, if the requested resources are not available, then a response is returned that the requested resources cannot be reserved (act 310). The response is returned to, for example, the service control manager. The service control manager can then take any appropriate action, such as not running the service, running the service but notifying the service that the requested resources are not available to the service, notifying the service to make another request for (presumably lowered) resources, and so forth.

Optionally, if the requested resources are not available at the current time, a notification at a later time when the requested resources are available can be sent. For example, the resource manager can maintain a record of the request, and if the requested resources are later available, send a notification to the service control manager that the requested resources are available. This allows resources to be again requested by the service control manager. Additionally or alternatively, the requested resources can be reserved for some duration of time (e.g., 5 seconds) to allow the resources to be again requested by the service control manager.

Figure 4:
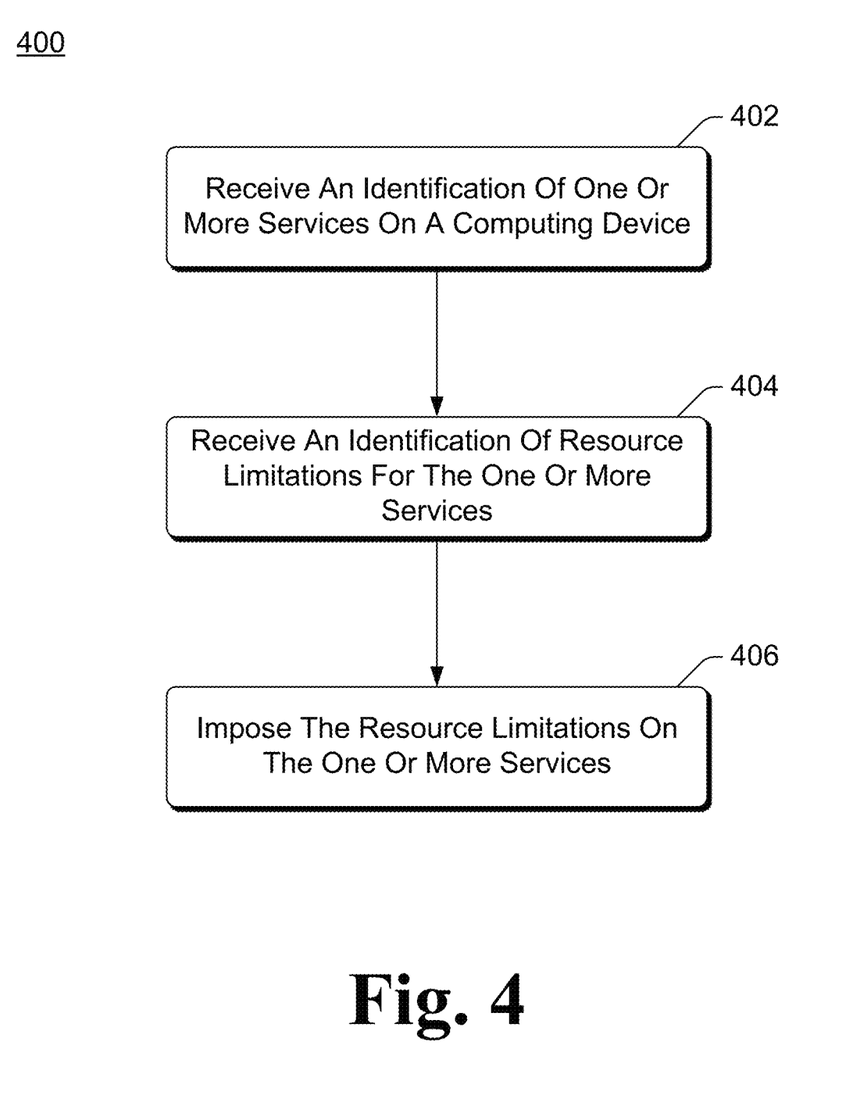

FIG. 4 is a flowchart illustrating another example process 400 for implementing the resource management for services in accordance with one or more embodiments. Process 400 is carried out by a resource management system, such as resource management system 102 of FIG. 1, and can be implemented in software, firmware, hardware, or combinations thereof. Process 400 is shown as a set of acts and is not limited to the order shown for performing the operations of the various acts. Process 400 is an example process for implementing the resource management for services; additional discussions of implementing the resource management for services are included herein with reference to different figures.

In process 400, an identification of one or more services on a computing device is received (act 402). This identification is received, for example, by a resource manager from a service control manager. The one or more services can be already running, can be in the process of beginning running (e.g., requested to run but not yet executing), and so forth.

An identification of resource limitations for the one or more services is also received (act 404). This identification can also include an amount of a resource limitation, such as a fixed amount (e.g., 10 megabytes of memory), a relative or variable amount (e.g., 5% of the memory in the computing device), and so forth. The resource limitations can be determined in various manners, such as from the one or more services themselves, from various policies or rules, and so forth as discussed above.

The resource limitations are imposed on the one or more services (act 406). The resource limitations can be imposed in various manner, such as communicating with an operating system kernel to impose the limitations.

Returning to FIG. 1, in one or more embodiments, the resource manager 106 exposes an application programming interface (API) including one or more methods that can be invoked by the service control manager 104 to notify the resource manager 106 of services 112, to notify the resource manager 106 to monitor resource usage by various services 112, and so forth. The service control manager 104 also optionally exposes an API including one or more methods that can be invoked by a service 112 and/or the resource manager 106.

It should be noted that the techniques discussed herein provide a dynamic system that detects potential problems resulting from resource usage by services on the computing device, and remedies those potential problems during operation. In contrast to systems that may merely trace or log resource usage and rely on later reprogramming of the service to cure any identified problems, the techniques discussed herein allow problems to be remedied as they are identified.

Furthermore, the techniques discussed herein allow incremental problems or issues that can grow (in conjunction with other incremental problems or issues) into a larger problem. For example, one service using greater than a threshold amount of disk I/O may not cause any performance degradation noticeable to a user of the computing device, but several services all using greater than the threshold amount of disk I/O may cause a performance degradation that is noticeable to a user of the computing device. The techniques discussed herein allow detection of the single service using greater than the threshold amount of disk I/O, allowing a remedial action to be taken before that small problem can grow into a large problem.

The techniques discussed herein further allow identification of a particular service that is causing a problem in the computing device 100. E.g., if a particular service is consuming a large amount (e.g., 50%) of the memory in the computing device 100, the resource manager 106 can readily identify that that particular service is causing a problem in the computing device 100 because the resource usage threshold value for memory for that particular service was satisfied.

It should further be noted that the resource usage threshold values discussed herein can be changed over time and/or in response to various different events, conditions, or utilization of the computing device 100. A resource allocation can be adapted or different according to the current conditions of the computing device 100. Rather than a single value for a resource, a policy can define several values associated with different conditions explaining under what conditions particular ones of the values is to be used. For example, if it is deemed desirable (e.g., by the operating system kernel 108) for the computing device 100 to run in a low power mode, a policy of the computing device 100 can indicate that the resource usage threshold values should be lowered. This serves to reduce the amount of resources that are available to the services and thus reduce power consumption. E.g., if the computing device 100 is to run in a low power mode, the resource usage threshold value for processor usage may drop from 5% to 1%, thereby reducing how much time the service can run (e.g., only 1% of the processor's capacity) and reducing power consumption by the computing device 100.

The techniques discussed herein support various different usage scenarios. For example, an administrator or vendor can collect various data over time from various different computing devices to determine what resource usage threshold values for what resources result in performance degradation that is noticeable to the user or stress on the computing device (e.g., excessive battery usage due to excessive disk I/O or CPU usage). These resource usage threshold values can be provided to the service control manager 104, which can provide the resource usage threshold values to the resource manager 106, and by monitoring for the resource usage threshold values and taking appropriate remedial actions can allow the performance degradation or stress on the computing device to be avoided.

The techniques discussed herein can also be used to monitor the overall state of the computing device 100 attempt to free up some resources if there is significant (e.g., greater than a threshold amount) of contention for the resources. For example, if there is greater than a threshold amount of contention for the disk I/O resource, the resource manager 106 can notify the service control manager 104 that a remedial action is to be taken for one or more of the services 112 in an attempt to free up the disk I/O resource and reduce the contention for the disk I/O resource. The service control manager 104 can take any of the remedial actions discussed above to attempt to reduce usage of the disk I/O resource.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
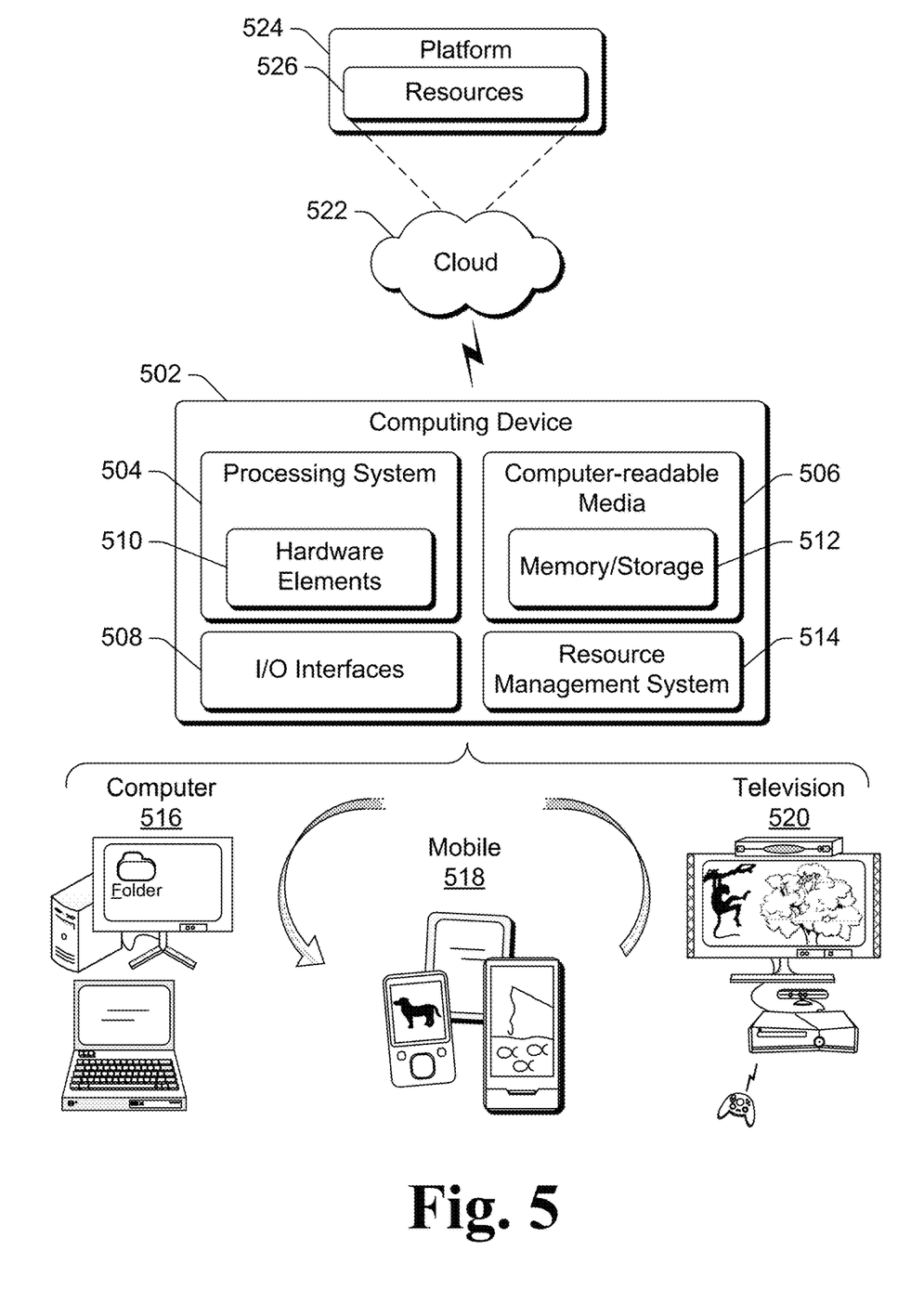
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Resistive RAM (ReRAM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a resource management system 514. The resource management system 514 provides various functionality for managing resource usage by services as discussed above. The resource management system 514 can implement, for example, the resource management system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: receiving, from a service control manager, an identification of one or more services running on the computing device; receiving, from the service control manager, an identification of one or more resource usage threshold values for the one or more services; monitoring usage, by each of the one or more services, of one or more resources on the computing device; detecting that one of the one or more services has satisfied at least one resource usage threshold value for the one service; and notifying the service control manager to take an appropriate remedial action in response the one service satisfying the at least one resource usage threshold value.

Alternatively or in addition to any of the methods or devices described herein, any one or combination of: further comprising receiving, from the service control manager, an identification of resources to reserve for at least one of the one or more services, and reserving the identified resources for use by the at least one of the one or more services; further comprising receiving, from the service control manager, an identification of resource limitations for at least one of the one or more services, and communicating with an operating system on the computing device to limit, in accordance with the identified resource limitations, usage of the at least one of the one or more resources by the one service; the remedial action comprising terminating one or more processes that host the one service; the remedial action comprising temporarily stopping one or more processes that host the one service until an event occurs; the remedial action comprising requesting the one service to reduce its resource usage; the at least one resource usage threshold value comprising multiple different threshold values, the multiple different threshold values including a first threshold value and a second threshold value, the detecting and notifying comprising detecting that the first threshold value is satisfied for the one service, notifying the service control manager to take a first remedial action in response to the first threshold value being satisfied, detecting that the second threshold value is satisfied for the one service, and notifying the service control manager to take a second remedial action in response to the second threshold value being satisfied; the first remedial action comprising requesting the one service to reduce its resource usage, and the second remedial action comprising stopping or terminating the one service; the at least one resource usage threshold value varying based on a current power mode of the computing device.

A computing device comprising: a processor; a computer-readable storage medium having stored thereon multiple instructions that implement a resource manager and that, responsive to execution by the processor, cause the processor to: receive, from a service control manager, an identification of a service running on the computing device; receive, from the service control manager, an identification of at least one resource usage threshold value for the service; monitor usage, by the service, of one or more resources on the computing device; detect that at least one resource usage threshold value has been satisfied for the service; and notify the service control manager to take an appropriate remedial action in response to the at least one resource usage threshold value having been satisfied for the service.

Alternatively or in addition to any of the methods or devices described herein, any one or combination of: the multiple instructions further causing the processor to receive, from the service control manager, a request to reserve resources for the service, and reserve the requested resources for use by the service; the multiple instructions further causing the processor to receive, from the service control manager, an identification of resource limitations for the service, and communicate with an operating system on the computing device to limit, in accordance with the identified resource limitations, usage of the one or more resources by the service; the remedial action comprising terminating one or more processes that host the service; the remedial action comprising temporarily stopping one or more processes that host the service until an event occurs; the remedial action comprising requesting the service to reduce its resource usage; the at least one resource usage threshold value comprising multiple different threshold values, the multiple different threshold values including a first threshold value and a second threshold value, and wherein to detect and notify is to detect that the first threshold value is satisfied for the service, notify the service control manager to take a first remedial action in response to the first threshold value being satisfied, detect that the second threshold value is satisfied for the service, and notify the service control manager to take a second remedial action in response to the second threshold value being satisfied; the first remedial action comprising requesting the service to reduce its resource usage, and the second remedial action comprising stopping or terminating the service; the at least one resource usage threshold value varying based on a current power mode of the computing device.

A computing device comprising: a service control manager configured to provide to a resource manager an identification of a service running on the computing device and an identification of one or more resource usage threshold values for the service; the resource manager configured to monitor usage, by the service, of one or more resources on the computing device, detect that the one or more resource usage threshold values for the service are satisfied, and notify the service control manager to take an appropriate remedial action in response the one or more resource usage threshold values for the service being satisfied; and the service control manager further configured to take the appropriate remedial action.

Alternatively or in addition to any of the methods or devices described herein, any one or combination of: the one or more resource usage threshold values comprising multiple different threshold values, the multiple different threshold values including a first threshold value and a second threshold value, and the resource manager further configured to detect that the first threshold value is satisfied for the service, notify the service control manager to take a first remedial action in response to the first threshold value being satisfied, detect that the second threshold value is satisfied for the service, and notify the service control manager to take a second remedial action in response to the second threshold value being satisfied; the remedial action comprising terminating one or more processes that host the service; the remedial action comprising temporarily stopping one or more processes that host the service until an event occurs; the remedial action comprising requesting the service to reduce its resource usage.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device having a processor configured to execute instructions to provide one or more computing services, the method comprising:
   receiving data representing an identification of a service running on the computing device and an identification of a resource and a corresponding requested usage value for the service;
   in response to receiving the data,
      determining whether a level of the resource currently available in the computing device satisfies the requested usage value for the service;
      in response to determining that the level of the resource currently available in the computing device satisfies the requested usage value, issuing a resource usage threshold to the service and allowing the service to consume the resource according to the issued resource usage threshold; and
      in response to determining that the level of the resource currently available in the computing device does not satisfy the requested usage value, preventing the service from being executed by the processor; and
   reserving an amount of the resource corresponding to the issued resource usage threshold by reducing the level of the resource currently available in the computing device by the issued resource usage threshold; and
   wherein determining whether the level of the resource currently available in the computing device satisfies the requested usage value for the service includes determining whether the level of the resource currently available in the computing device satisfies the requested usage value for the service based on a record of the resource that has already been reserved by one or more other services.

2. The method of claim 1 wherein allowing the service to consume the resource according to the issued resource usage threshold includes:
   monitoring usage of the resource by the service on the computing device;
   detecting that the service has exceeded the issued resource usage threshold value for the service; and
   in response to detecting that the service has exceeded the issued resource usage threshold value for the service, terminating the service on the computing device.

3. The method of claim 1 wherein allowing the service to consume the resource according to the issued resource usage threshold includes:
   monitoring usage of the resource by the service on the computing device;
   detecting that the service has exceeded the issued resource usage threshold value for the service; and
   in response to detecting that the service has exceeded the issued resource usage threshold value for the service, temporarily stopping one or more processes that host the service.

4. The method of claim 1 wherein allowing the service to consume the resource according to the issued resource usage threshold includes:
   monitoring usage of the resource by the service on the computing device;
   detecting that the service has exceeded the issued resource usage threshold value for the service; and
   in response to detecting that the service has exceeded the issued resource usage threshold value for the service, requesting the service to reduce usage of the resource.

5. The method of claim 1 wherein:
   the issued resource usage threshold includes a first usage threshold and a second usage threshold higher than the first usage threshold; and
   allowing the service to consume the resource includes:
      monitoring usage of the resource by the service on the computing device;
      in response to detecting that the service has exceeded the first usage threshold for the service, requesting the service to reduce consumption of the resource; and
      in response to detecting that the service has exceeded the second usage threshold for the service, terminating the service on the computing device.

6. The method of claim 1, further comprising:
   adjusting the issued resource usage threshold for the service based on a current power mode of the computing device.

7. A computing device, comprising:
   a processor; and
   a memory containing instructions executable by the processor to cause the computing device to:
      receive data representing an identification of a service running on the computing device and an identification of a resource and a corresponding requested usage value for the service;
      in response to receiving the data,
         determine whether a level of the resource currently available in the computing device satisfies the requested usage value for the service;
         in response to determining that the level of the resource currently available in the computing device satisfies the requested usage value, issue a resource usage threshold to the service and allow the service to consume the resource according to the issued resource usage threshold; and
         in response to determining that the level of the resource currently available in the computing device does not satisfy the requested usage value, prevent the service from being executed by the processor;
      reserve an amount of the resource corresponding to the issued resource usage threshold by reducing the level of the resource currently available in the computing device by the issued resource usage threshold; and
      wherein to determine whether the level of the resource currently available in the computing device satisfies the requested usage value for the service includes to determine whether the level of the resource currently available in the computing device satisfies the requested usage value for the service based on a record of the resource that has already been reserved by one or more other services.

8. The computing device of claim 7 wherein to allow the service to consume the resource according to the issued resource usage threshold includes to:
monitor usage of the resource by the service on the computing device;
detect that the service has exceeded the issued resource usage threshold value for the service; and
in response to detecting that the service has exceeded the issued resource usage threshold value for the service, terminate the service on the computing device.

9. The computing device of claim 7 wherein to allow the service to consume the resource according to the issued resource usage threshold includes to:
monitor usage of the resource by the service on the computing device;
detect that the service has exceeded the issued resource usage threshold value for the service; and
in response to detecting that the service has exceeded the issued resource usage threshold value for the service, temporarily stop one or more processes that host the service.

10. The computing device of claim 7 wherein to allow the service to consume the resource according to the issued resource usage threshold includes to:
monitor usage of the resource by the service on the computing device;
detect that the service has exceeded the issued resource usage threshold value for the service; and
in response to detecting that the service has exceeded the issued resource usage threshold value for the service, request the service to reduce usage of the resource.

11. The computing device of claim 7 wherein:
the issued resource usage threshold includes a first usage threshold and a second usage threshold higher than the first usage threshold; and
to allow the service to consume the resource includes to:
monitor usage of the resource by the service on the computing device;
in response to detecting that the service has exceeded the first usage threshold for the service, request the service to reduce consumption of the resource; and
in response to detecting that the service has exceeded the second usage threshold for the service, terminate the service on the computing device.

12. A method implemented in a computing device having a processor configured to execute instructions to provide one or more computing services, the method comprising:
receiving data representing an identification of a service running on the computing device and an identification of a resource and a corresponding requested usage value for the service;
in response to receiving the data,
determining whether a level of the resource currently available in the computing device satisfies the requested usage value for the service;
in response to determining that the level of the resource currently available in the computing device satisfies the requested usage value, issuing a resource usage threshold to the service and allowing the service to consume the resource according to the issued resource usage threshold; and
in response to determining that the level of the resource currently available in the computing device does not satisfy the requested usage value, preventing the service from being executed by the processor; and wherein allowing the service to consume the resource includes:
monitoring usage of the resource by the service on the computing device;
detecting that the service has exceeded the issued resource usage threshold value for the service; and
in response to detecting that the service has exceeded the issued resource usage threshold value for the service, requesting the service to reduce usage of the resource.

13. The method of claim 12, further comprising:
reserving an amount of the resource corresponding to the issued resource usage threshold by reducing the level of the resource currently available in the computing device by the issued resource usage threshold.

14. The method of claim 12, further comprising:
reserving an amount of the resource corresponding to the issued resource usage threshold by reducing the level of the resource currently available in the computing device by the issued resource usage threshold; and
wherein determining whether the level of the resource currently available in the computing device satisfies the requested usage value for the service includes determining whether the level of the resource currently available in the computing device satisfies the requested usage value for the service based on a record of the resource that has already been reserved by one or more other services.

15. The method of claim 12 wherein allowing the service to consume the resource according to the issued resource usage threshold further includes temporarily stopping one or more processes that host the service in response to detecting that the service has exceeded the issued resource usage threshold value for the service.

16. The method of claim 12 wherein:
the issued resource usage threshold includes a first usage threshold and a second usage threshold higher than the first usage threshold; and
allowing the service to consume the resource includes:
monitoring usage of the resource by the service on the computing device;
in response to detecting that the service has exceeded the first usage threshold for the service, requesting the service to reduce consumption of the resource; and
in response to detecting that the service has exceeded the second usage threshold for the service, terminating the service on the computing device.

17. The method of claim 12, further comprising adjusting the issued resource usage threshold for the service based on a current power mode of the computing device.

18. The method of claim 12 wherein the resource usage threshold comprising a first threshold value and a second threshold value different than the first threshold value, and wherein allowing the service to consume the resource comprising:
detecting that the first threshold value is satisfied for the service;
performing a first remedial action in response to the first threshold value being satisfied;
detecting that the second threshold value is satisfied for the service; and
performing a second remedial action in response to the second threshold value being satisfied.

19. The method of claim 18 wherein the first remedial action comprising requesting the service to reduce its resource usage, and the second remedial action comprising stopping or terminating the service.

20. The method of claim 12 wherein the resource usage threshold value varies based on a current power mode of the computing device.

* * * * *